US008629886B2

(12) United States Patent
Michail et al.

(10) Patent No.: US 8,629,886 B2
(45) Date of Patent: Jan. 14, 2014

(54) LAYER COMBINATION IN A SURFACE COMPOSITION SYSTEM

(75) Inventors: Ashraf Michail, Redmond, WA (US); Alan Liu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 471 days.

(21) Appl. No.: 12/961,501

(22) Filed: Dec. 7, 2010

(65) Prior Publication Data
US 2012/0139918 A1    Jun. 7, 2012

(51) Int. Cl.
*G06T 11/60*    (2006.01)
*G06T 15/40*    (2011.01)

(52) U.S. Cl.
USPC ............ 345/629; 345/419; 345/421; 345/422

(58) Field of Classification Search
USPC .................. 345/419, 422, 629, 421
See application file for complete search history.

(56) References Cited

U.S. PATENT DOCUMENTS

| 5,896,139 | A * | 4/1999 | Strauss .......................... 345/440 |
| 6,064,393 | A * | 5/2000 | Lengyel et al. ................ 345/427 |
| 6,266,068 | B1 * | 7/2001 | Kang et al. .................... 345/629 |
| 6,963,346 | B2 | 11/2005 | Lewis |
| 7,688,319 | B2 | 3/2010 | Miller |
| 7,733,347 | B2 | 6/2010 | Tarditi et al. |
| 2006/0109284 | A1 * | 5/2006 | Hsieh et al. ................... 345/639 |
| 2006/0244748 | A1 * | 11/2006 | Long et al. .................... 345/422 |
| 2009/0184960 | A1 | 7/2009 | Carr et al. |

OTHER PUBLICATIONS

Wang, John; May 1994; "Representing Moving Images with Layers"; IEEE Transactions on Image Processing Special Issue: Image Sequence Compression, vol. 3, No. 5, p. 625-638.*
Zwicker, et al., "A Survey and Classification of Real Time Rendering Methods", Retrieved at << http://www.cs.princeton.edu/courses/archive/fall02/cs526/papers/zwicker00.pdf >>, Mar. 29, 2000, pp. 39.
"Gecko: Layers", Retrieved at << https://wiki.mozilla.org/Gecko:Layers >>, Nov. 11, 2009, pp. 15.

* cited by examiner

*Primary Examiner* — Xiao M. Wu
*Assistant Examiner* — Todd Buttram (57) ABSTRACT

A system and method for processing and rendering multiple layers of a two-dimensional scene. A system provides a mechanism to determine a number of scene surfaces and a mapping between scene layers and scene surfaces. The mechanisms may include combining and aggregating areas of layers to create one opaque surface, aggregating non-overlapping semi-transparent opaque areas of layers, or creating surfaces from overlapping semi-transparent surfaces. Moving objects are accommodated, so that layers below a moving object may be rendered properly in frames where the moving object is above the layer and frames where the moving object is not above the layer, for each pixel.

18 Claims, 10 Drawing Sheets

LAYER COMBINATION IN A SURFACE COMPOSITION SYSTEM

BACKGROUND

Some graphics rendering systems use a scene graph to represent the visual elements of a scene. Portions of a scene graph represent corresponding surfaces, some of which are static and some of which move within the scene. In order to render the various surfaces, a system may keep track of each surface for each frame. If a moving surface is above a static surface relative to a specific pixel in a frame, the moving surface is displayed for that pixel. If the moving surface moves so that it is no longer visible for that pixel, the surface below it must be rendered. Some techniques for handling such situations maintain data for each surface during the life of the frame, so that correct surfaces can be displayed as one or more surfaces move.

When one or more surfaces are not completely opaque, maintaining data for each surface allows the system to render various combinations of surfaces as one or more surfaces move. A graphics processing unit (GPU) can receive data for multiple surfaces, including an opaqueness factor, and render each pixel.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to render multiple graphic layers. This may include processing each layer to determine whether two or more layers can be combined into a single surface prior to processing by a GPU. Some mechanisms include combining opaque elements of multiple layers into one surface. Some mechanisms include combining semi-transparent elements of multiple layers into one surface. Each surface may include a depth buffer that indicates a z-order value for each pixel of the surface. A GPU may receive multiple surfaces and process them to create a completed frame based on the z-ordering of each surface for each pixel address.

In one embodiment, mechanisms include receiving a scene graph that includes multiple static layers, each with a corresponding depth value, and a moving layer with a corresponding depth value. An area of pixels on each static layer may be determined, such that the pixels of each area have different pixel addresses. The areas may be aggregated to create a surface with a depth value corresponding to each pixel of each area. A moving surface may be created from the moving layer, with a depth value corresponding to each pixel. A graphics processing unit may receive the layers and compose them to produce a completed frame.

In one aspect of the mechanisms described herein, areas having opaque pixels from multiple layers may be aggregated to produce one surface layer. The topmost opaque pixels at each pixel address may be determined for inclusion in the surface layer.

In one aspect of the mechanisms described herein, the areas have semi-transparent pixels, and are aggregated to produce one surface layer. The areas are determined based on whether the pixels overlap other semi-transparent pixels and whether a moving layer is positioned between the area pixels and a semi-transparent pixel that they overlap. Semi-transparent pixels that do not overlap another semi-transparent pixel with a moving layer in between may be selected for inclusion in the surface layer.

In one aspect of the mechanisms described herein, semi-transparent pixels that overlap another semi-transparent pixel and have a moving layer between them may be selected for inclusion in a surface layer. In one embodiment, one surface layer may be created for each overlap level of semi-transparent pixels.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data. An application component may be implemented as a combination of physical circuitry and associated logic. For example, an ASIC may be used to implement an application component.

As used herein, the term semi-transparent refers to an object's property of permitting light to be transmitted, wherein a semi-transparent object is visible, but allows at least some light to pass through so that an object behind it is partially visible. A semi-transparent object has an opacity value less than 1.0 and greater than 0.0. An opaque object has an opacity value of 1.0 or very close to 1.0. A semi-transparent graphical object is one that exhibits the characteristics of semi-transparency. More specifically, a computer graphics system implements a semi-transparent pixel by blending it with a pixel behind it to give an appearance of semi-transparency.

As used herein, the term "pixel address" refers to a location of a pixel in a two-dimensional grid. A pixel refers to a unit of a layer or surface at a specific pixel location. A scene may have multiple pixels corresponding to a specific pixel address, each layer having zero or one such pixel.

A pixel that has the same pixel address as another pixel from another layer or surface and has a higher z-order is said to be above and "overlap" the other pixel. The other pixel is said to be underneath and "overlapped" by the overlapping pixel.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

Figure 1:
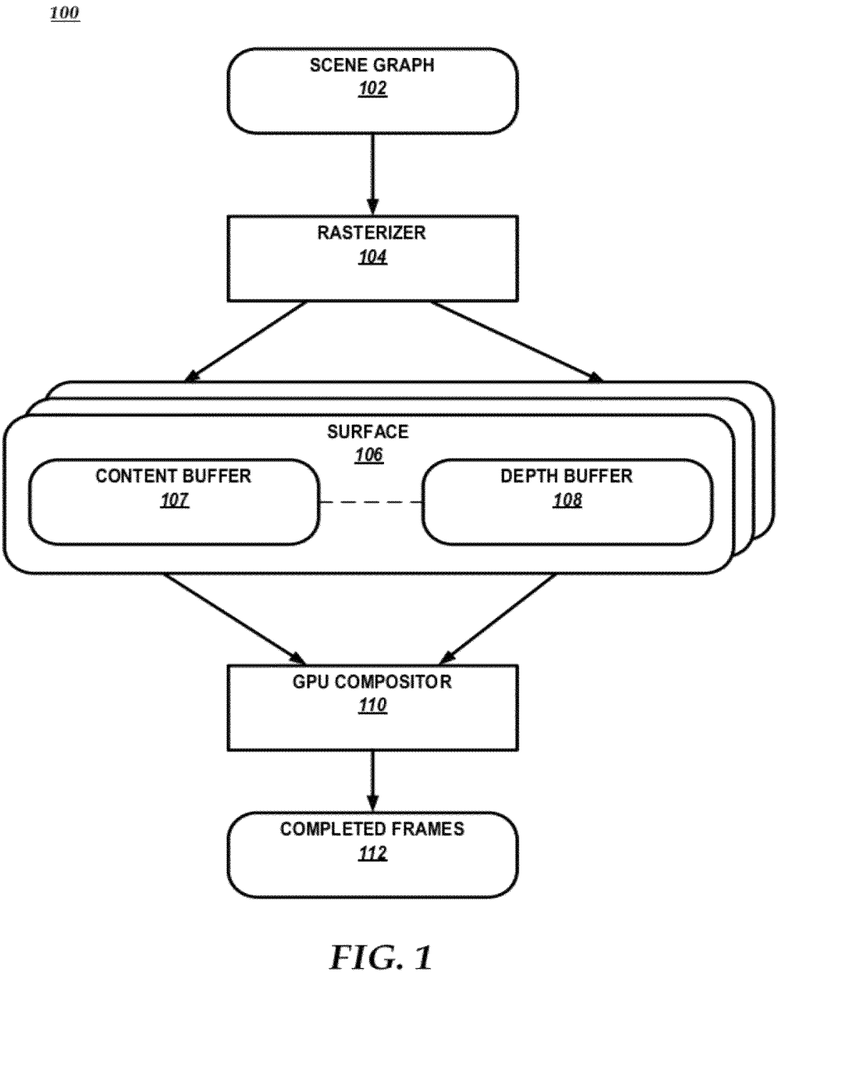
FIG. 1 is a block diagram of an example system in which mechanisms described herein may be deployed.
Figure 2:
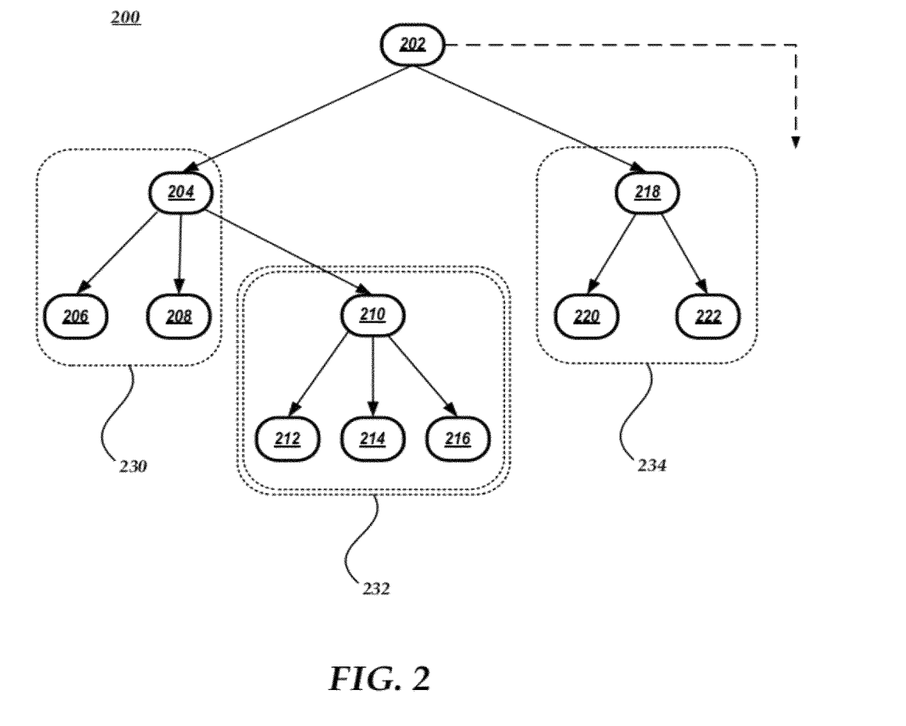
FIG. 2 is a block diagram of an example scene graph that may be processed by mechanisms described herein.

FIG. 1 is a block diagram of an example system 100 in which mechanisms described herein may be deployed. The illustrated example system 100 includes scene graph 102. A scene graph is a data structure that represents a graphical scene. A scene graph may be input to the example system 100, and processed by the system. FIG. 2 illustrates an example scene graph.

As illustrated, system 100 includes rasterizer 104. Generally, rasterizer 104 receives scene graph 102 and processes it to prepare for further processing by a GPU. In one embodiment, rasterizer 104 generates surfaces 106 corresponding to scene graph 102. In one implementation, a surface may be represented by a content buffer and a depth buffer. In the illustrated embodiment, surface 106 includes content buffer 107 and depth buffer 108, each of which is described in more detail herein.

In the illustrated embodiment, surfaces 106 are passed as input to GPU compositor 110. GPU compositor 110 performs processing for each pixel address of a frame to determine a visible pixel. This may include selecting one or more surface pixels that are visible and, if more than one pixel is visible, combining them to produce one pixel. Each pixel thus produced is included in completed frame 112, which is then rendered for display or other processing. In one embodiment, GPU compositor 110 is a processor that is configured to perform multiple parallel operations. In one embodiment, a general purpose processor configured with software program instructions may be used to perform the actions of GPU compositor.

FIG. 2 is a block diagram of an example scene graph 200, or a portion thereof, that may be processed by mechanisms described herein. Scene graph 200 may be used as scene graph 102 of FIG. 1.

In one embodiment, a scene graph is implemented as a directed graph, in which each leaf node represents an element of the scene. In some embodiments, non-leaf nodes may also represent elements of the scene. An element may be a vector, a bitmap, or other format corresponding to a scene element. Example scene graph 200 includes nodes 202-222. A scene graph may include less nodes or many more nodes, though a limited set is included herein for illustrative purposes. The illustrated nodes include one root node 202, though some scene graphs may include multiple root nodes. Leaf nodes 206, 208, 212, 214, 216, 220, and 222 correspond to elements of the scene. A group of nodes may correspond to a layer or surface of a scene. Subgraph 230, which includes node 204 and leaf nodes 206-208, represent a static layer.

Subgraph 232, which includes node 210 and leaf nodes 212-216, represents another layer. In this example scene graph, subgraph 232 represents a moving object, and is so indicated by double dashed lines. A layer that includes one or more moving objects is referred to herein as a moving layer. A layer that includes only static elements is referred to as a static layer.

Subgraph 234, which includes node 218 and leaf nodes 220-222, represents another static layer. In one implementation, the ordering of the subgraphs in the scene graph indicates a z-ordering of the corresponding layers in the scene. For example, subgraph 234 may correspond to a background layer having a z-order of 1, subgraph 232 may correspond to a moving layer above the background and having a z-order of 2, and subgraph 230 may correspond to a static layer above the moving layer and having a z-order of 3. Various implementations may have other ways of indicating an ordering of the layers that make up the scene graph.

Figure 3:
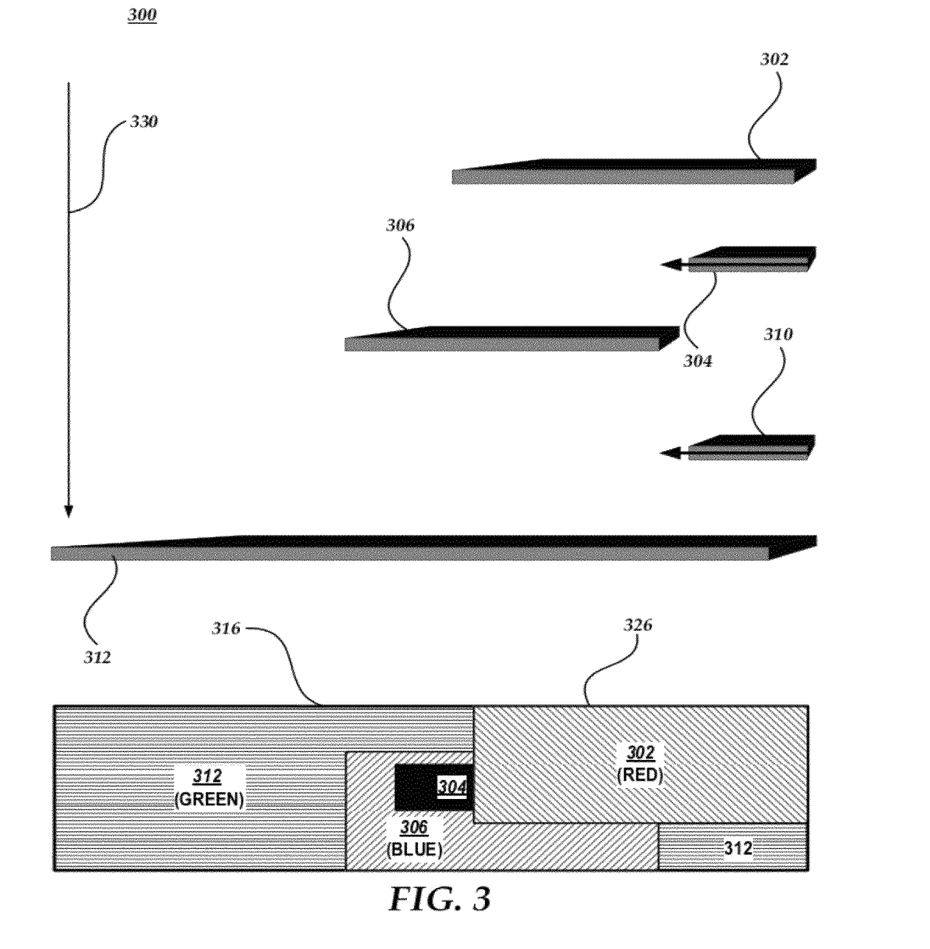
FIG. 3 is an example of multiple graphic layers that may be processed by mechanisms described herein.

FIG. 3 is an example of multiple graphic layers 300 that may be processed by mechanisms described herein. Graphic layers 300 may be represented as a scene graph. Scene graph 200 may correspond to a portion of graphic layers 300.

As illustrated, graphic layers 300 includes layers 302, 304, 306, 310, and 312, listed herein in their corresponding z-order from top down. By the convention used herein, layer 312 has a depth of 1; layers 310, 306, 304, and 302 have respective depths of 2-5. Thus, layer 312 is a background layer, and layer 302 is the topmost layer. Layers 304 and 310 are moving layers, as indicated by respective arrows; layers 302, 306, and 310 are static layers in the current scene. Each of layers 302, 304, and 306 may be represented by a subgraph, such as subgraph 230, 232, and 234, respectively.

Arrow 330 indicates the direction of view of the scene. The scene represents a two-dimensional scene in a plane perpendicular to the page and perpendicular to arrow 330. A scene may include one or more frames, each frame being a snapshot at a point in time. The duration of a scene may be measured by the number of frames it includes or by a measure of time.

Each of layers 302-312 are shown as opaque layers. An opaque layer is a layer in which all of its pixels are opaque. Each pixel of each layer has a color property, and each pixel may be the same or different than other pixels. Scene view 316 shows the visible portions of each of the static layers 302, 306, and 312 in an example frame. As illustrated, layer 302 obstructs portions of layers 306 and 312; layer 306 obstructs a portion of layer 312. Because each static layer is opaque, at each pixel address of each area, the content of one layer is visible.

Moving layer 304 is also shown in scene view 316 in an example position that may occur in a frame of the scene. The actual location of moving layer 304 may vary from frame to frame. In the example position of FIG. 3, moving layer 304 is partially obscured by layer 302, due to layer 302 having a higher z-order than layer 304; moving layer 304 obscures a portion of layer 306, because it has a higher z-order than layer 306. Moving layer 310 is not illustrated in scene view 316. For illustrative purposes, example layer 312 is assumed to be entirely green, example layer 306 is assumed to be entirely blue, and example layer 302 is assumed to be entirely red. In actual embodiments, each pixel of each layer may be any color. As illustrated in FIG. 3, each of the static layers is separated from the other static layers by at least one moving layer.

Figure 4:
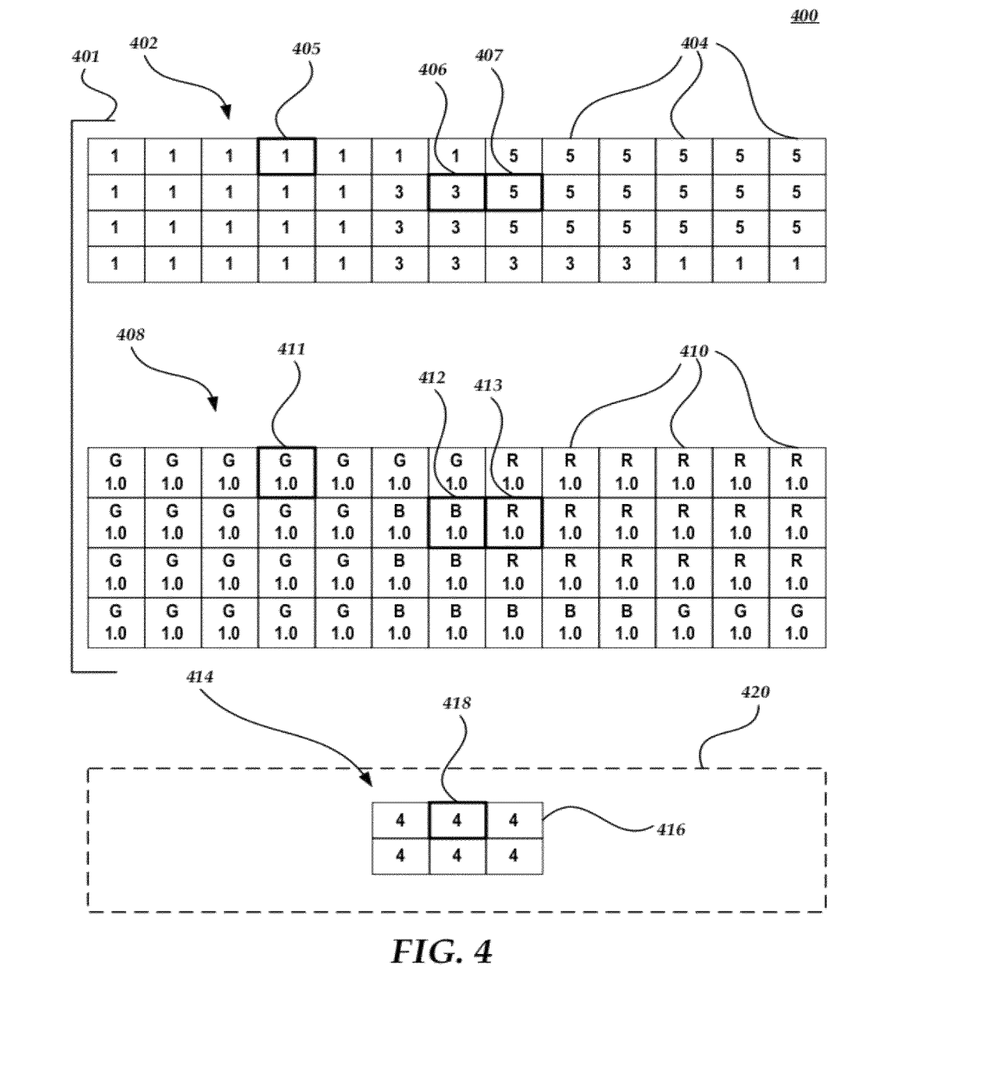
FIG. 4 is a block diagram illustrating surface data that may be produced from the graphic layers of FIG. 3, in accordance with mechanisms described herein.

FIG. 4 is a block diagram illustrating surface data 400 that may be produced from the graphic layers 300 of FIG. 3, in accordance with mechanisms described herein.

In one implementation, surface data 400 includes depth buffer 402 and corresponding content buffer 408. Each depth buffer entry 404 of depth buffer 402 has a corresponding content buffer entry 410 in content buffer 408. The combination of depth buffer 402 and content buffer 408 represents one surface 401 that may be created based on the scene layers as represented by graphic layers 300. A depth buffer entry 404 and a corresponding content buffer entry 410 represent one pixel of a surface.

Each depth buffer entry 404 indicates a z-order value of the corresponding content. Each content buffer entry 410 includes content data indicating a color and an opacity value. In the illustrated example, depth buffer entry 405 and content buffer entry 411 represent one pixel of surface 401 having a color green (G), an opacity value of 1.0, and a z-order of 1 at this particular pixel. This pixel is derived from layer 312. Similarly, depth buffer entry 406 and content buffer entry 412 represent one pixel of surface 401 having a color blue (B), an opacity value of 1.0, and a z-order of 3 at this particular pixel. This pixel is derived from layer 306. Depth buffer entry 407 and content buffer entry 413 represent one pixel of surface 401 having a color red (R), an opacity value of 1.0, and a z-order of 5 at this particular pixel. This pixel is derived from layer 302.

A static surface may include one or more depth buffer entries and content buffer entries, one pair of entries for each pixel of the surface, depending on the dimensions of the surface. As illustrated by depth buffer 402, each depth buffer entry, corresponding to respective pixels, may have the same or different z-order values from other depth buffer entries of the same surface. Thus, one surface may include one or more depths. Similarly a corresponding surface content buffer may have corresponding entries with color and opacity values that are the same or differ for each entry.

In one embodiment, generation of a surface may include combining multiple opaque layers into one surface. This may include determining, at each pixel address, a topmost opaque layer, and creating depth buffer data and content buffer data based on the corresponding pixel of this layer. In example depth buffer 402, the entries that contain a z-order value of 1 are derived from layer 312; the entries that contain a z-order value of 3 are derived from layer 306; and the entries that contain a z-order value of 5 are derived from layer 302. The corresponding content buffer entries are derived from the same respective layers. Thus, depth buffer entry 405 and content buffer entry 411 are derived from layer 312, which is the topmost opaque layer at the corresponding position; depth buffer entry 406 and content buffer entry 412 are derived from layer 306, which is the topmost opaque layer at the corresponding position; and depth buffer entry 407 and content buffer entry 413 are derived from layer 302, which is the topmost opaque layer at the corresponding position.

FIG. 4 further includes depth buffer 414, representing surface data derived from the moving object of layer 304. The actual position of the moving object may differ in each frame. FIG. 4 illustrates an example position, corresponding approximately to the position of layer 304 in scene view 316 of FIG. 3. Dotted line 420 illustrates the outline of the scene, and the position of the surface relative to the larger scene. A surface can represent any area of a scene and include any one or more pixel addresses of the scene.

In depth buffer 414, each depth buffer entry contains a z-order value of 4, corresponding to layer 304. Depth buffer entry 418 represents one particular pixel. Depth buffer entry 406 and content buffer entry 412 correspond to the same pixel address, though at a different depth. Because depth buffer entry 418 contains a higher z-order value than depth buffer entry 406, and the moving object of layer 304 is opaque, the content corresponding to depth buffer entry 418 will be visible and obscure the content of surface 401. Similarly the z-order of depth buffer entry 407 is higher than the corresponding depth buffer entry 416. Therefore, the content of surface 401 will be visible at this pixel address in this frame. This is illustrated in scene view 316, where layer 304 obscures a portion of layer 306, and layer 302 obscures a portion of layer 304.

Figure 5:
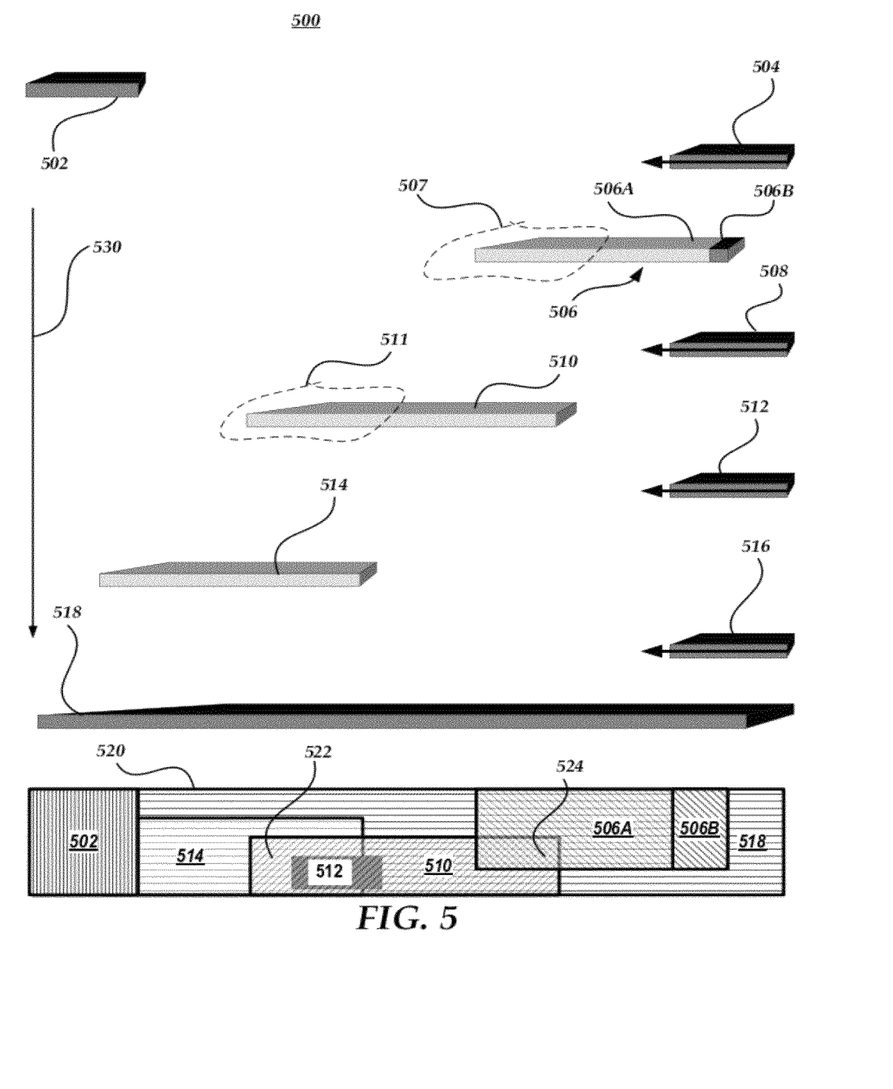
FIG. 5 is another example of multiple graphic layers representing a scene that may be processed by mechanisms described herein.

FIG. 5 is another example of multiple graphic layers 500 representing a scene that may be processed by mechanisms described herein. This example includes static layers 502, 506, 510, 514, and 518, in order from the top down. It also includes moving layer 506 between layers 502 and 506, moving layer 508 between layers 506 and 510, and moving layer 516 between static layers 514 and 518. Static layers 510, and 514 are semi-transparent layers; static layers 502 and 518 are opaque layers. Static layer 506 includes a semi-transparent area 506A and an opaque area 506B. Each of layers 502-518 may be represented by a subgraph of a scene graph. As used herein, the term "semi-transparent layer" applies to a semi-transparent area of a static layer, such as semi-transparent area 506A; the term "opaque layer" applies to an opaque area of a static layer, such as opaque are 506B.

As described for FIG. 3, arrow 530 indicates the direction of view of the scene, and is perpendicular to the plane of the two-dimensional scene.

Scene view 520 illustrates an example view of the static scene layers in an example frame. As illustrated, layer 502 obscures portions of layers 514 and 518, each of which has a lower z-order than layer 502. Layer 518, with the lowest z-order, is visible though partially obscured by semi-transparent layers in some areas. Semi-transparent layer 514 is visible and layer 518 is visible through it. Semi-transparent layer 510 is visible and layers 514 and 518 are visible through it. In area 522, content of layers 510, 514, and 518 is visible. Semi-transparent area 506A is visible and overlaps parts of layers 510 and 518. In area 524, content of layers 506, 510, and 518 is visible. Opaque area 506B obscures a portion of layer 518 that is below it.

In a frame of the scene, each moving object of layers 504, 508, 512, or 516 may be in any position within its range of motion. In some positions, each moving layer may obscure a portion of otherwise visible layers below it. In some positions, a portion of a moving layer may be obscured by an opaque layer above it. In some positions, a portion of a moving layer may be visible through one or more semi-transparent layers.

The moving object of layer 512 is shown in scene view 520 in an example position that may occur in a frame of the scene. In the example position of FIG. 5, the moving object of layer 512 is visible through semi-transparent layer 510, which has a higher z-order. Because layer 512 is opaque in this example, the area of layer 514 that is beneath it is obscured and therefore not visible in this example frame. As illustrated in FIG. 5, each of the static layers is separated from the other static layers by at least one moving layer.

Figure 6:
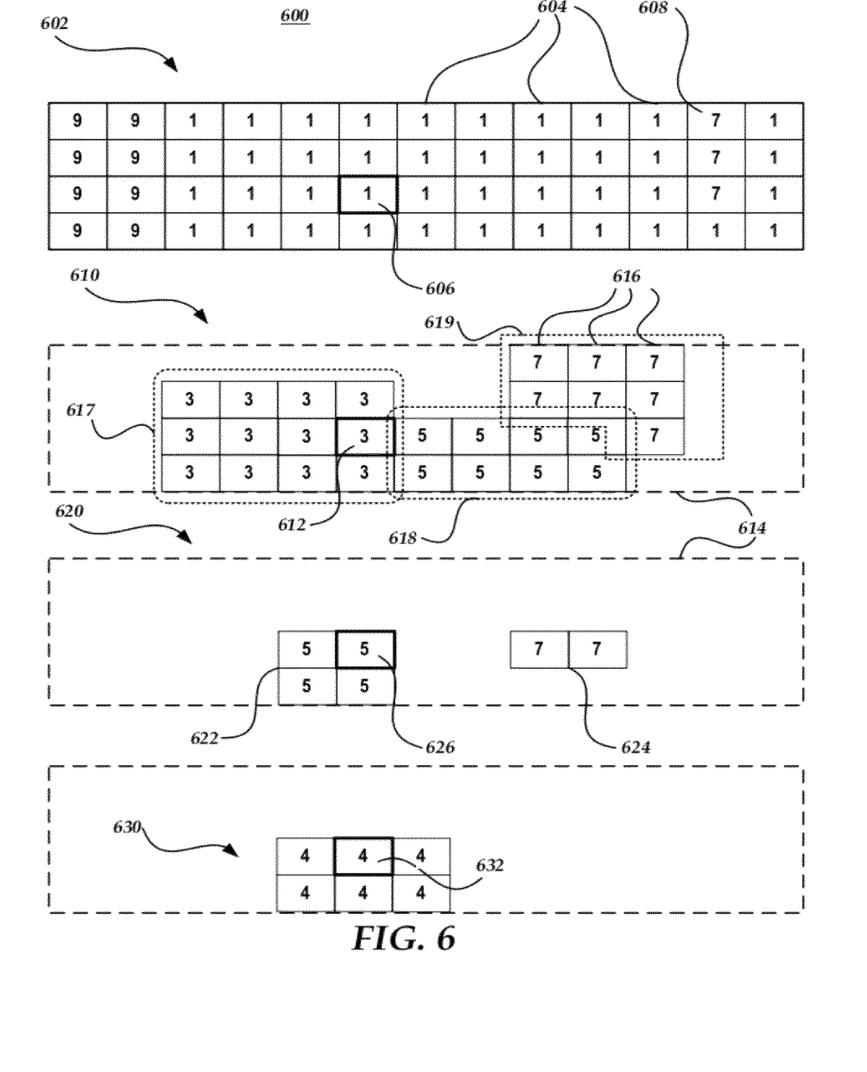
FIG. 6 is a block diagram illustrating surface data that may be produced from the graphic layers of FIG. 5, in accordance with mechanisms described herein.

FIG. 6 is a block diagram illustrating surface data 600 that may be produced from the graphic layers 500 of FIG. 5, in accordance with mechanisms described herein.

In one implementation, surface data 600 includes depth buffer 602 and a corresponding content buffer (not shown). Each depth buffer entry 604 of depth buffer 602 has a corresponding content buffer entry in the content buffer. The combination of depth buffer 602 and the corresponding content buffer represents one surface that may be created based on the scene layers as represented by graphic layers 300. A depth buffer entry 604 and a corresponding content buffer entry represent one pixel of this surface.

As described for FIG. 4, each depth buffer entry 604 indicates a z-order value of the corresponding content. Each content buffer entry includes content data indicating a color and an opacity value. In the illustrated example, depth buffer entry 606 and its corresponding content buffer entry represent one pixel of one surface having a z-order of 1 at this particular pixel. This pixel is derived from layer 518. Depth buffer entry 608 and its corresponding content buffer entry are derived from area 506B of layer 506.

Depth buffer 610 represents a second surface that may be created based on graphic layers 500. In the illustrated example, the surface represented by depth buffer 610 is created by combining areas of layers 514, 510, and 506. The depth buffer entries enclosed by dotted line 617 and containing a z-order of 3 are derived from an area of layer 514; the depth buffer entries enclosed by dotted line 618 and containing a z-order of 5 are derived from an area of layer 510; and the depth buffer entries identified by dotted line 619 and containing a z-order of 7 are derived from an area of layer 506.

In one embodiment, semi-transparent areas that do not overlap other semi-transparent areas are combined into one surface. Depth buffer 610 provides an example of such a surface created by combining non-overlapping transparent areas from three different surfaces. As used herein, the term "non-overlapping area" refers to an area that does not overlap another semi-transparent area of another layer. As illustrated, a non-overlapping semi-transparent area may overlap an opaque area of another layer.

In a scene having no overlapping semi-transparent areas, one surface may suffice to represent all of the semi-transparent layers. The scene of FIG. 5 contains two areas where semi-transparent overlap exists. These are illustrated as areas 522 and 524 in scene view 520. As used herein, the term "overlap level" refers to the number of semi-transparent layers that a semi-transparent area overlaps. In FIG. 5, area 522 of layer 510 overlaps layer 514, and thus has an overlap level of one; area 524 of area 506A overlaps layer 510 and also has an overlap level of one.

In one embodiment, semi-transparent overlap areas having a common overlap level may be combined into a respective surface. In the example of FIG. 5, overlap areas 522 and 524, of layers 510 and 506, respectively, may be combined into one surface. Depth buffer 620 represents a surface created by combining overlap areas 522 and 524. The surface represented by depth buffer 620 is not contiguous. It includes a set of entries 622 having a z-order of 5 representing overlap area 522 and a set of entries 624 with a z-order of 7 representing overlap area 524.

Depth buffer entry 626 has a z-order of 5 and corresponds to the same pixel address as depth buffer entries 612 and 606. This entry falls within area 522 of scene view 520, in which areas of layers 510, 514, and 518 may be visible.

Depth buffer 630 represents surface data derived from the moving object of layer 512. As described for the moving object corresponding to depth buffer 414, this surface may differ in each frame with respect to the correspondence of pixels and pixel addresses. The position of depth buffer 630 illustrates an example position for a frame. In depth buffer 630, each depth buffer entry contains a z-order value of 4, corresponding to layer 512. Depth buffer entry 632 corresponds to the same pixel address as depth buffer entries 606, 612, and 626. In the illustrated position, the surface represented by depth buffer 630 may be visible through semi-transparent layer 510. This is illustrated by layer 512 in scene view 520. In a frame in which layer 512 does not fall within this pixel address, layers 514 and 518 may be visible through semi-transparent layer 510. This is illustrated by the portion of area 522 that does not include layer 512.

In the examples of FIGS. 5 and 6, five static layers are combined to create three surfaces, and the total area of the three surfaces is less than the total area of the five static layers. Thus, mechanisms described herein may reduce an amount of memory, an amount of processing, or another computing resource that is used to rasterize and render a scene corresponding to a scene graph.

In one embodiment, a semi-transparent area of a layer may be combined with a corresponding area of another layer that it overlaps if there is not a moving object between the pixels of the areas in the scene. For example, if layer 508 is omitted from the example of FIG. 5, the overlapping areas of layer 506 and 510 may be blended to produce an area for a surface. The blended area may be represented in depth buffer 610 in place of the corresponding area of layer 510. In one implementation, the z-order for this blended area may be that of the higher layer. In a configuration in which areas of layer 506 and 510 are combined in this way, the set of entries 624 representing the area of layer 506 may be omitted.

Similarly, a semi-transparent area of a layer may be combined with a corresponding opaque area of another layer that it overlaps if there is not a moving object between them within the pixels of the area. The blended area may be used in the surface representing opaque layers, as discussed herein.

As discussed herein, whether a layer is considered to be a moving layer with respect to a pixel address may be based on whether the region of movement includes the pixel address. For example, in FIG. 5, if it is known that the moving object of layer 508 does not intersect the area of overlap between layers 506 and 510 during the scene, the above-described combination of this area of these layers may be performed.

As illustrated by the static layers and surfaces of FIGS. 3-6, one aspect of the mechanisms described herein determines static surfaces that include pixels based on an opacity level of each pixel and a relationship of pixels having a common pixel address. More specifically, semi-transparent pixels may be selectively selected for a surface based on whether they overlap other semi-transparent pixels at the same pixel address. Opaque pixels may be selectively selected for a surface based on whether they are the topmost opaque pixel at their pixel address.

Figure 7:
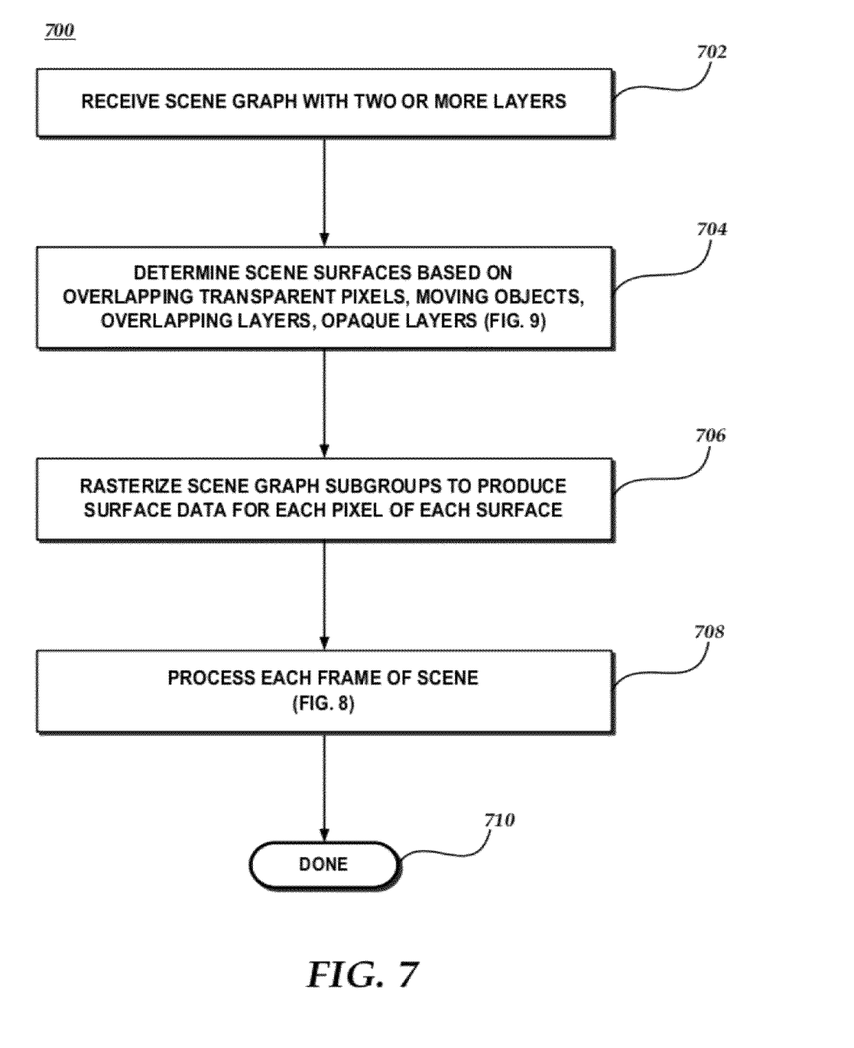
FIG. 7 is a flow diagram illustrating an example embodiment of a process for rendering multiple graphic surfaces, in accordance with mechanisms described herein.

FIG. 7 is a flow diagram illustrating an example embodiment of a process 700 for rendering multiple graphic surfaces. Process 700, or a portion thereof, may be performed by various embodiments of system 100 or a variation thereof. Components of system 100 are used as examples of an implementation herein, though in various embodiments, the correspondence of process actions and components may vary. The illustrated portions of process 700 may be initiated at block 702, where a scene graph having two or more layers may be received. The scene graph may be in the form of a directed graph, as illustrated in FIG. 2, or in another form. The scene graph may have zero, one, or more moving objects, and zero, one or more semi-transparent static layers.

Figure 9:
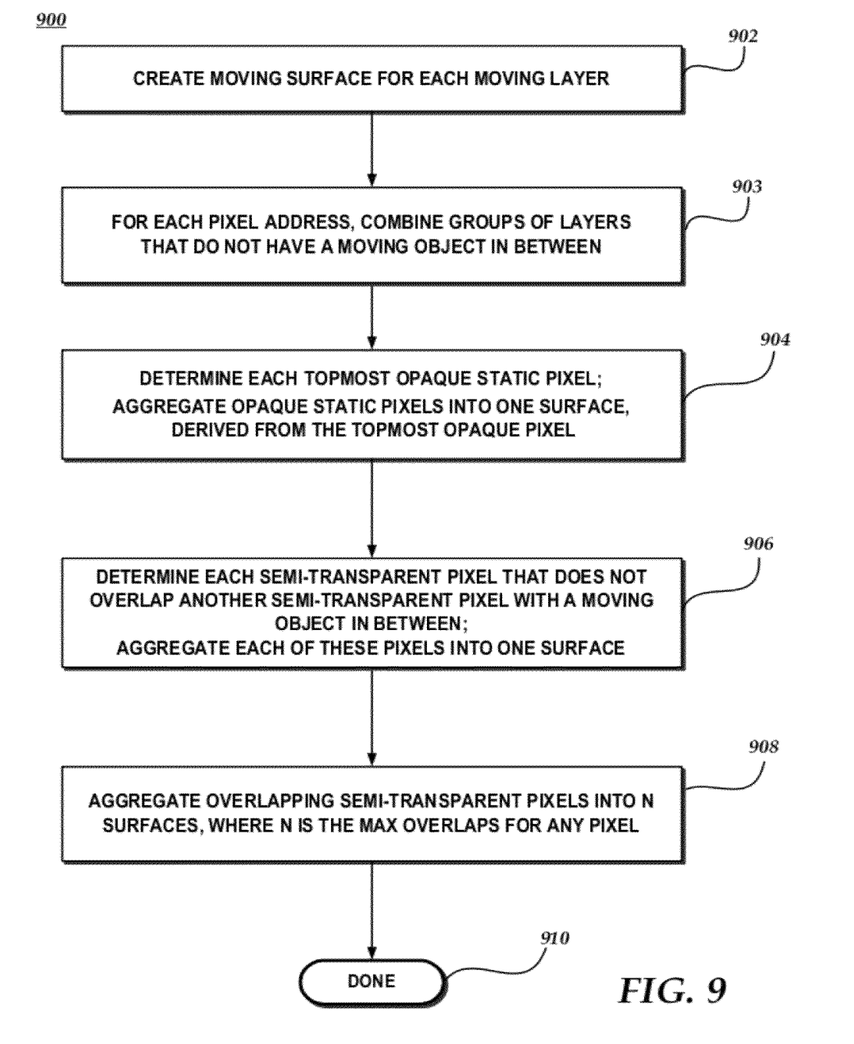
FIG. 9 is a flow diagram illustrating an example embodiment of a process 900 for determining one or more scene surfaces from a set of scene layers.

The process may flow to block 704, where a determination is made of scene surfaces based on the scene graph data. More specifically, the determination may be based on one or more of a configuration of overlapping semi-transparent static layers, moving objects, and opaque static layers overlapping other static layers below it, for each pixel address. The actions of block 704 may include determining a number of scene surfaces to create and a mapping of layers to scene surfaces, for each pixel address. FIG. 9 illustrates an example process that may be used to implement block 704.

The process may flow to block 706, where one or more layers of the scene graph are used to produce surface data for each pixel address. In particular, vector elements of scene graph 102 may be rasterized to produce each pixel for each surface. This may include determining a z-order, a color, or an opacity level for corresponding depth buffer entries and content buffer entries. In one embodiment, this rasterization is performed after the determination of scene surfaces. By deferring rasterization of vector content for static surfaces until after the scene surfaces and mappings are known, vector elements belonging to different layers may be rasterized together to produce a single surface, though the z-order values for the surface may differ for different pixels. Also, vector elements that are obscured by other opaque elements may be omitted from rasterization. Depth buffers and content buffers of FIGS. 4 and 6 illustrate examples of surface data that may be produced.

In one embodiment, surface data may be stored in a surface cache for subsequent retrieval when providing the surface data to a GPU for each frame. In this way, the vector elements of each layer may be rasterized one time for a scene. When processing each frame, the cached surface data may be retrieved without additional rasterizing of layer vector content.

Figure 8:
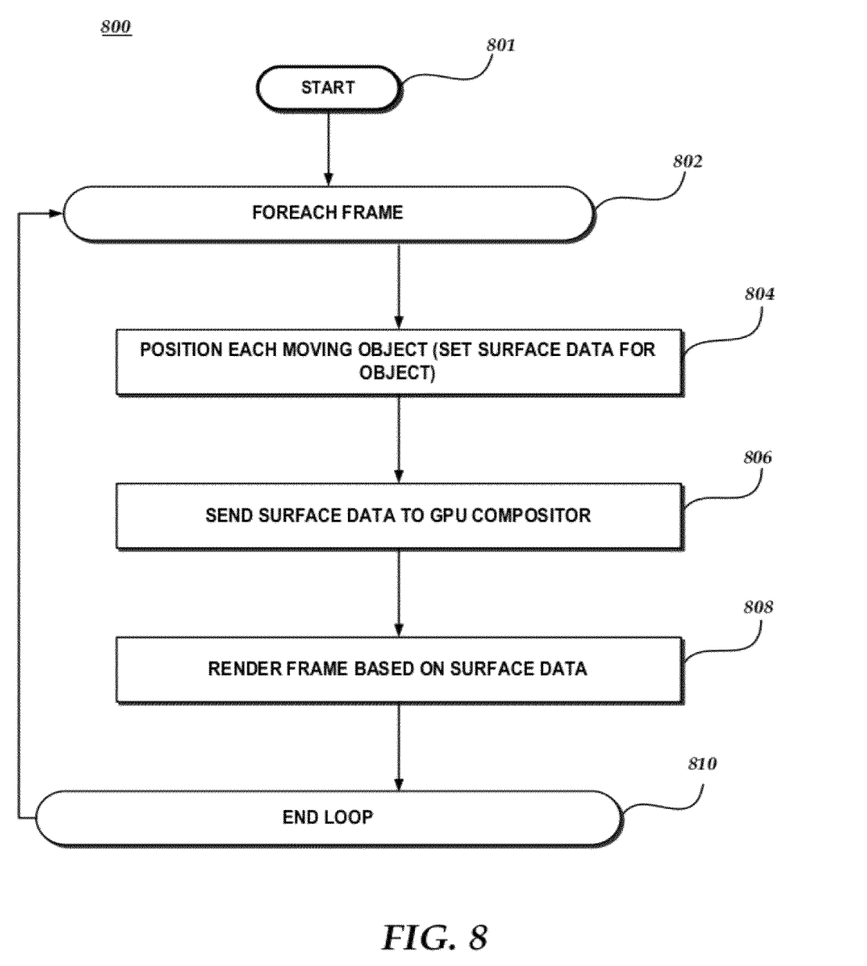
FIG. 8 is a flow diagram illustrating an example embodiment of a process for processing each frame of a scene, in accordance with mechanisms described herein.

The process may flow to block 708, where each frame of the scene is processed; generating a set of completed frames, such as completed frames 112 of FIG. 1. FIG. 8 illustrates an example process that may be used to implement block 708.

The process may flow to done block 710, and exit or return to a calling program.

FIG. 8 is a flow diagram illustrating an example embodiment of a process 800 for processing each frame of a scene. Process 800, or a portion thereof, may be used to implement at least a portion of the actions of block 708, of FIG. 7. The illustrated portions of process 800 may be initiated at start block 801 and flow to loop 802. Loop 802 may iterate for each frame. As illustrated, one embodiment of loop 802 includes blocks 804-810, and is terminated by block 810. The frame of each iteration is referred to as the "current frame" herein.

Loop 802 may begin at block 804, where each moving object is positioned. In one implementation, this may be performed by setting the surface data for each pixel of the object layer to the corresponding pixel of the object, based on its movement. Content buffer entry 418 of FIG. 4 contains data for a corresponding pixel of the moving object of layer 304, of FIG. 3. As the object moves for each frame in the scene, the data of content buffer entry 414 may change to reflect the pixel of layer 304 that corresponds to the pixel address of depth buffer entry 418 in the current frame. Similar changes may occur for each content buffer entry associated with the moving object of layer 304.

The process may flow to block 806, where surface data for the current frame may be sent to a GPU compositor. The process may flow to block 806, where the GPU compositor receiving the surface data may render the current frame based on the surface data. In one embodiment, the GPU employs the z-order value of each entry in the depth buffer for each pixel address to compose the associated content data, resulting in content data for the pixel. Composition may include combining data of multiple surfaces, in a situation with at least one visible semi-transparent surface. Composition may include omitting a surface pixel that is obscured by another opaque surface pixel above it. In one implementation, the actions of block 808 may generate a two-dimensional frame with each pixel set appropriately for display, or for further processing prior to display.

The process may flow to block 810, which terminates loop 802. Based on the iteration and configuration, the process may flow back to loop 802 for another iteration, or exit to a calling program, such as process 600. In one embodiment, process 800, or at least a portion thereof, may be performed by rasterizer 104 of FIG. 1.

FIG. 9 is a flow diagram illustrating an example embodiment of a process 900 for determining one or more scene surfaces from a set of scene layers. Determining scene surfaces may include determining a number of surfaces and a mapping of scene layers to surfaces for each pixel address. Process 900, or a portion thereof, may be used to implement at least a portion of the actions of block 704, of FIG. 7. In one embodiment, process 900, or at least a portion thereof, may be performed by rasterizer 104 of FIG. 1.

The illustrated portions of FIG. 9 may begin at block 902, where a moving surface is determined corresponding to each moving layer. In one embodiment, the mapping between moving layers and corresponding surfaces is a one-to-one mapping, so that one surface is created for each moving layer, at a specified pixel address. In one embodiment, the content of a moving surface may be derived from corresponding pixels of a moving layer. As discussed herein, at each frame, each moving surface may be adjusted to reflect the position of the moving object at that frame.

The process may flow to block 903, where some pixels may be mapped to be combined with pixels of layers below it that do not have a moving object in between. A group of multiple pixels from multiple corresponding layers may thus be combined. In a group having a semi-transparent pixel above another layer, the former pixel may be blended with the latter pixel. A pixel below an opaque pixel in a group may simply be omitted. In one implementation, the resulting pixel may be given a z-order of the topmost opaque pixel in the group if one exists. Though the actions of block 903 are referenced separately, the actions of block 903 may be performed in combination with any other blocks of process 900.

The process may flow to block 904, where a determination is made of the topmost opaque static pixel for each pixel address in the scene. In one implementation, opaque and semi-transparent pixels below the topmost static pixel are mapped to be combined with the topmost opaque static pixel by using the data of the latter to create depth buffer and content buffer entries. In the example of FIGS. 3 and 4, the data of surface 401 is derived from layers 302, 306, or 312, based on which one includes the topmost opaque static pixel for each pixel address. In the example of FIGS. 5 and 6, the opaque surface represented by depth buffer 602 includes data derived from layers 502, 506B, or 518, based on which one includes the topmost static pixel for each pixel address.

The process may flow to block 906, where a determination may be made of each semi-transparent pixel that does not overlap another semi-transparent pixel with a moving object in between the overlapping pixel and the overlapped pixel. The set of such pixels may include pixels from any combination of layers. As noted herein, the actions of block 903 determines a mapping to combine overlapping pixels with overlapped pixels that do not have a moving object in between. Therefore, overlapping pixels that remain have a moving object in between them and the overlapped pixels. These overlapping pixels with a moving object in between are excluded from the actions of block 906. One surface may be created by aggregating all such non-overlapping semi-transparent pixels, the resulting surface including, for each pixel address, one semi-transparent pixel, or no pixel. Depth buffer 610 of FIG. 6 is an example of data for one surface that is created, with data derived from layers 506, 510, and 514. The area of the resulting surface may be any size up to the maximum scene size. In some configurations, zero pixels may be determined and a surface containing non-overlapping semi-transparent pixels is not created. As described at block 904, in one implementation, semi-transparent pixels that are overlapped by an opaque pixel are excluded from the surface determined at block 906.

The process may flow to block 908, where zero or more surfaces may be determined by aggregating semi-transparent pixels that overlap another semi-transparent pixel and have a moving object in between the overlapping pixel and overlapped pixel. In one embodiment, one surface is determined corresponding to each overlap level of the scene. In a scene having a maximum overlap level of N, N such surfaces may be created. The example of FIGS. 5 and 6 contain one overlap level and thus create one corresponding surface. In some configurations, there may be no such overlapping semi-transparent pixels, and no corresponding surface is created. As described at block 904, in one implementation, semi-transparent pixels that are overlapped by an opaque pixel are excluded from the surface created at block 908.

The process may flow to done block 910 and exit or return to a calling program, such as process 700. It is to be noted that process 900, or a variation thereof, may be implemented in a variety of ways. The actions of process 900 may be performed in different sequences than the example embodiment of FIG. 9. As described, process 900 results in a determination of one or more surfaces and a mapping of pixels from one or more layers to each surface. The creation of the determined surfaces may then be performed at block 706 of FIG. 7. However, in various implementations, the creation of one or more surfaces may be integrated with the actions of process 900.

In accordance with the mechanisms described herein, in some configurations of a scene graph having multiple layers, a set of associated surfaces may be created and mapped to at least a portion of the multiple layers such that the number of surfaces is less than the number of layers. As discussed, the number of surfaces may be based on the number of overlap levels for the scene.

Figure 10:
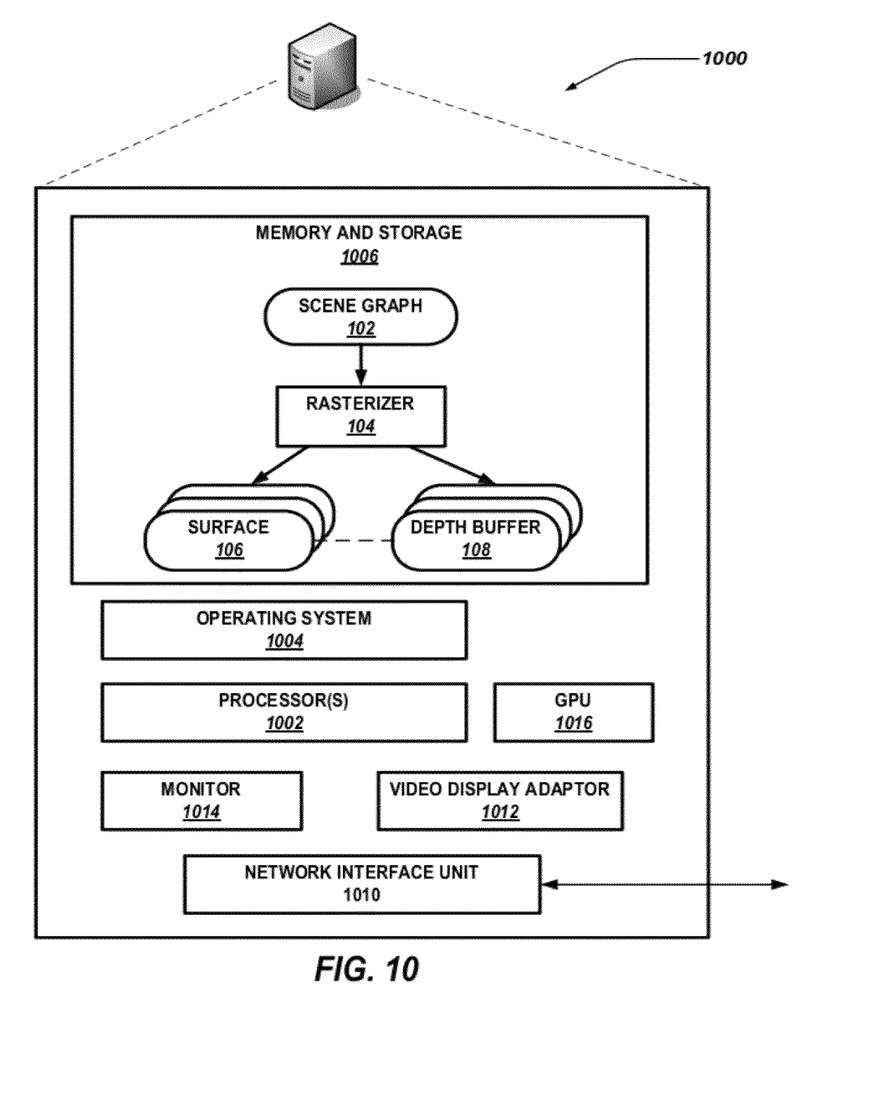
FIG. 10 is a block diagram showing one embodiment of a computing device, illustrating selected components of a computing device that may be used to perform functions described herein.

FIG. 10 is a block diagram showing one embodiment of a computing device 1000, illustrating selected components of a computing device that may be used to implement mechanisms described herein, including system 100 and processes 700, 800, or 900. Computing device 1000 may include many more components than those shown, or may include less than all of those illustrated. Computing device 1000 may be a standalone computing device or part of an integrated system, such as a blade in a chassis with one or more blades. Though the components of computing device 1000 are illustrated as discrete components, any one or more of them may be combined or integrated into an integrated circuit, such as an ASIC.

As illustrated, computing device 1000 includes one or more processors 1002, which perform actions to execute instructions of various computer programs. In one configuration, each processor 1002 may include one or more central processing units, one or more processor cores, one or more ASICs, cache memory, or other hardware processing components and related program logic. As illustrated, computing device 1000 includes an operating system 1004. Operating system 1004 may be a general purpose or special purpose operating system. The Windows® family of operating systems, by Microsoft Corporation, of Redmond, Wash., includes examples of operating systems that may execute on computing device 1000.

In one embodiment, computing device 1000 includes one or more graphics processing units (GPU) 1016. A GPU is a processor that is configured to perform graphics operations, such as rendering a graphic image. GPU 1016 may be used to implement GPU compositor 110 of FIG. 1.

Memory and storage 1006 may include one or more of a variety of types of non-transitory computer storage media, including volatile or non-volatile memory, RAM, ROM, solid-state memory, disk drives, optical storage, or any other medium that can be used to store digital information.

Memory and storage 1006 may store one or more components described herein or other components. In one embodiment, memory and storage 1006 stores scene graph 102, rasterizer 104, one or more surfaces 106 and corresponding depth buffers 108. In various embodiments, one or more of these components may be omitted from memory and storage 1006. In some embodiments, at least a portion of one or more components may be implemented in a hardware component, such as an ASIC. In various configurations, multiple components implementing the functions or including the data of these components may be distributed among multiple computing devices. Communication among various distributed components may be performed over a variety of wired or wireless communications mechanisms.

Any one or more of the components illustrated as stored in memory and storage 1006 may be moved to different locations in RAM, non-volatile memory, or between RAM and non-volatile memory by operating system 1004 or other components. In some configurations, these components may be distributed among one or more computing devices.

Computing device 1000 may include a video display adapter 1012 that facilitates display of data, scene frames, or other information to a user. Though not illustrated in FIG. 10, computing device 1000 may include a basic input/output system (BIOS), and associated components. Computing device 1000 may also include a network interface unit 1010 for communicating with a network. Software components, such as those stored in memory and storage 1006, may be received via transitory media and network interface unit 1010. Computing device 1000 may include one or more display monitors 1014. Embodiments of computing device 1000 may include one or more input devices (not shown), such as a keyboard, pointing device, touch screen, keypad, audio component, microphone, voice recognition component, or other input/output mechanisms.

It will be understood that each block of the flowchart illustration of FIGS. 7-9, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of rendering a two-dimensional graphic scene, the method comprising:
 a) receiving a scene graph including a first static layer having a corresponding depth value, a second static layer having a corresponding depth value, and a moving layer, the moving layer having a depth value between respective depth values of the first static layer and the second static layers; each of the first static layer and the second layer containing a corresponding vector element;
 b) determining a first area of pixels in the first static layer and a second area of pixels in the second static layer, the pixels of the first area having different pixel addresses from the pixels of the second area;
 c) creating a first surface that includes the first area and the second area, the first surface comprising a depth value corresponding to each pixel of the first area and the second area;
 d) creating a second surface that includes a moving area of the moving layer; and
 e) providing the first surface and the second surface to a graphics processing unit for composition of the first surface and the second surface based on the depth values;
 f) rasterizing at least one vector element of the second static layer prior to providing the first surface and the second surface to the graphics processing unit for composition, and not rasterizing at least one other vector element of the second layer.

2. The computer-based method of claim 1, further comprising determining the first area to be an area containing topmost opaque pixels at the pixel addresses of the first area, and determining the second area to be an area containing topmost opaque pixels at the pixel addresses of the second area.

3. The computer-based method of claim 1, wherein the pixels of the first area are semi-transparent pixels and the pixels of the second area are semi-transparent pixels.

4. The computer-based method of claim 1, further comprising determining the first area to be an area containing semi-transparent pixels of the first layer that do not overlap semi-transparent pixels of the second layer; and creating a third surface that includes semi-transparent pixels of the first layer that overlap semi-transparent pixels of the second layer.

5. The computer-based method of claim 1, further comprising:
 a) creating a moving surface derived from the moving layer, each pixel of the moving surface having a corresponding depth value;
 b) providing the moving surface to the graphics processing unit for composition with the first surface and the second surface;
 c) storing the first surface and the second surface in a surface cache; and
 d) for each frame of the two-dimensional graphic scene, providing the first surface and the second surface to the graphics processing unit from the cache.

6. The computer-based method of claim 1, further comprising, for each frame of the graphic scene, positioning the second surface relative to the first surface.

7. The computer-based method of claim 1, further comprising creating a third surface that includes pixels corresponding to an overlapping third area of the first static layer and the second static layer, the third surface comprising, for each pixel of the overlapping third area, a depth value of a corresponding pixel of the second static layer.

8. The computer-based method of claim 1, further comprising creating a third surface that includes pixels corresponding to an overlapping third area of the first static layer and the second static layer, the third surface comprising, for each pixel of the overlapping third area, a depth value of a corresponding pixel of the second static layer, the first surface further comprising, for each pixel of the overlapping third area, a depth value of a corresponding pixel of the first static layer.

9. The computer-based method of claim 1, the scene graph including a number of static layers, including the first static layer and the second static layer, the method further comprising creating a number of static surfaces from the static layers, the number of static surfaces being greater than one and less than the number of static layers, the number of static surfaces based on a number of semi-transparent layers included in the number of static layers, a number of moving layers, and a depth of each moving layer.

10. A computer-readable storage memory comprising computer program instructions for rendering a two-dimensional graphic scene, the program instructions executable by one or more processors to perform actions including:
    a) receiving at least one moving layer having a corresponding depth value;
    b) receiving a plurality of static layers, each static layer having a corresponding depth value, each static layer separated from other static layers by one or more of the at least one moving layers, each static layer containing at least one vector element;
    c) determining a set of topmost opaque pixels, including pixels from at least two of the static layers;
    d) creating an opaque surface including the set of topmost opaque pixels, the opaque surface having a depth buffer that indicates a z-order for each pixel, including at least two different z-order values;
    e) creating one or more moving surfaces derived from the at least one moving layer, the moving surface having a depth buffer that indicates a z-order for each pixel; and
    f) providing the opaque surface and the one or more moving surfaces to a compositor for composition of the opaque surface and the one or more moving surfaces;
    wherein creating the opaque surface comprises rasterizing at least one vector element from a static layer of the plurality of static layers and determining pixels from the static layer of the plurality of static layers to exclude from rasterization; and wherein rasterizing the at least one vector element is performed prior to providing the opaque surface and the one or more moving surfaces to the compositor.

11. The computer-readable storage memory of claim 10, the actions further including:
    a) creating a semi-transparent surface by selectively selecting semi-transparent pixels from the plurality of static layers based on whether each pixel overlaps another semi-transparent pixel with a moving layer in between the pixel and the other semi-transparent pixel.

12. The computer-readable storage memory of claim 10 the actions further including creating a first static surface including semi-transparent pixels that each overlap at least one other semi-transparent pixel, and creating a second static surface including semi\-transparent pixels that do not overlap at least one other semi-transparent pixels.

13. A computer-based system for rendering a two-dimensional graphic scene having a plurality of static layers and at least one moving layer, each of the plurality of static layers containing at least one vector element and separated from other static layers of the plurality of static layers by at least one moving layer, the system comprising:
    a) a rasterizer configured to perform actions including:
        i) receiving a scene graph representing the graphic scene;
        ii) determining at least two areas of respective static layers of the plurality of static layers to be aggregated into one static surface;
        iii) after determining the at least two areas, rasterizing the at least two areas to create the one static surface, each pixel of the one static surface having a corresponding depth level; and
        iv) creating at least one moving surface based on the at least one moving layer, each pixel of the at least one moving surface having a corresponding depth level; and
    b) a processor configured to compose a frame of the graphic scene by composing the one static surface and the moving surface by employing the depth level of each pixel of the at least one moving surface and the depth level of each pixel of the one static surface;
    wherein the rasterizer actions further include selectively rasterizing each pixel of a vector element of at least one static layer of the plurality of static layers prior to providing the static surface and the moving surface to the processor, based on whether the pixel is obscured by an opaque element of another static layer of the plurality of static layers.

14. The computer-based system of claim 13, determining the at least two areas comprising:
    a) determining whether semi-transparent pixels of each static layer overlap semi-transparent pixels of other static layers; and
    b) determining the at least two areas based on the determination of overlapping semi-transparent pixels.

15. The computer-based system of claim 13, determining the at least two areas comprising:
    a) determining whether semi-transparent pixels of each static layer overlap semi-transparent pixels of other static layers; and
    b) determining the at least two areas to exclude semi-transparent pixels of each static layer that overlap semi-transparent pixels of other static layers.

16. The computer-based system of claim 13, determining the at least two areas comprising:
    a) determining whether semi-transparent pixels of each static layer overlap semi-transparent pixels of other static layers; and
    b) determining the at least two areas to include semi-transparent pixels of each static layer that overlap semi-transparent pixels of other static layers.

17. The computer-based system of claim 13, the rasterizer comprising means for determining static surfaces that include pixels from each of two or more static layers based on an opacity level of each pixel and a relationship of pixels having a common pixel address.

18. The computer-based system of claim 13, further comprising means for storing a depth value of each pixel in each surface.

* * * * *